United States Patent
Li

(10) Patent No.: US 9,277,362 B2
(45) Date of Patent: Mar. 1, 2016

(54) METHOD AND APPARATUS FOR GENERATING AND USING LOCATION INFORMATION

(75) Inventor: Andrey Li, Ottawa (CA)

(73) Assignee: BLACKBERRY LIMITED, Waterloo (CA)

(*) Notice: Subject to any disclaimer, the term of this patent is extended or adjusted under 35 U.S.C. 154(b) by 34 days.

(21) Appl. No.: 12/875,586

(22) Filed: Sep. 3, 2010

(65) Prior Publication Data

US 2012/0058782 A1    Mar. 8, 2012

(51) Int. Cl.
| | |
|---|---|
| *H04W 24/00* | (2009.01) |
| *H04W 4/02* | (2009.01) |
| *G01S 19/14* | (2010.01) |
| *H04W 64/00* | (2009.01) |
| *H04W 88/02* | (2009.01) |

(52) U.S. Cl.
CPC .............. *H04W 4/028* (2013.01); *G01S 19/14* (2013.01); *H04W 64/00* (2013.01); *H04W 88/02* (2013.01)

(58) Field of Classification Search
CPC ... H04W 84/045; H04W 88/08; H04W 24/02; H04W 92/02; H04W 92/12; H04W 28/08; H04W 4/06; H04W 84/22; H04W 88/02; H04W 88/10; H04W 88/16; H04W 92/045; H04W 28/10; H04W 36/0016; H04W 36/02; H04W 88/06; H04W 28/02; H04W 60/00
USPC .............................. 455/456.3, 457; 705/14.66
See application file for complete search history.

(56) References Cited

U.S. PATENT DOCUMENTS

| | | | |
|---|---|---|---|
| 6,349,257 B1 * | 2/2002 | Liu et al. ....................... | 701/438 |
| 6,456,936 B1 | 9/2002 | Neukirchen et al. | |
| 6,965,876 B2 | 11/2005 | Dabbiere | |
| 6,975,939 B2 | 12/2005 | Edwards et al. | |
| 7,053,830 B2 | 5/2006 | Krumm et al. | |
| 7,199,754 B2 | 4/2007 | Krumm et al. | |
| 7,218,938 B1 | 5/2007 | Lau et al. | |
| 7,250,907 B2 | 7/2007 | Krumm et al. | |
| 7,532,113 B2 | 5/2009 | Horvitz et al. | |
| 8,265,928 B2 * | 9/2012 | Kristjansson et al. ........ | 704/227 |
| 2004/0128066 A1 | 7/2004 | Kudo et al. | |
| 2005/0125148 A1 | 6/2005 | Van Buer | |
| 2006/0156209 A1 | 7/2006 | Matsuura et al. | |
| 2008/0132251 A1 * | 6/2008 | Altman et al. ................. | 455/457 |
| 2009/0003281 A1 | 1/2009 | Panabaker | |
| 2009/0082037 A1 | 3/2009 | Ju et al. | |
| 2010/0004997 A1 * | 1/2010 | Mehta et al. ............... | 705/14.66 |

(Continued)

OTHER PUBLICATIONS

Kochan, B. et al "Dynamic activity-travel diary data collection using a GPS-enabled personal digital assistant".

(Continued)

*Primary Examiner* — Olumide T Ajibade Akonai
*Assistant Examiner* — Natasha Cosme
(74) *Attorney, Agent, or Firm* — Perry + Currier Inc.

(57) ABSTRACT

A method and apparatus for generating and using location information is provided to a user of a mobile device. The method involves obtaining and processing a location history of the mobile device to determine locations of significance; automatically generating potential location identifiers associated with the locations of significance; and prompting, at a determined appropriate time, for user input for refining the set of one or more potential location identifiers into a customized location identifier.

28 Claims, 4 Drawing Sheets

(56) References Cited

U.S. PATENT DOCUMENTS

2010/0081456 A1 4/2010 Singh et al.
2010/0291950 A1* 11/2010 Lin et al. ............... 455/456.3

OTHER PUBLICATIONS

Filipe Meneses, Adriano Moreira, "Enhancing the Location-Context Through Inference Over Positioning Data," University of Minho, http://ubicomp.algoritmi.uminho.pt/csmu/proc/meneses-135.pdf.
Liao, L. et al "Location-based Activity Recognition," University of Washington, http://www.cs.washington.edu/ai/Mobile_Robotics/projects/activity-recognition/postscripts/places-nips-05.pdf.
Ramnath, V., et al."Harnessing Location-Context for Content-basedServices in Vehicular Systems," Institute for Infocomm Research, http://www-mrim.imag.fr/publications/2005/CHE05/chevallet05c_VTC05_HLCfCBSiVS.pdf.
Hitt, B. "Unsupervised Adaptive Clustering for Data Prospecting and Data Mining," The Data Administration Newsletter, Mar. 1, 1999, http://www.tdan.com/view-articles/5096/.
Jianmin Jiang, Jinchang Ren "Hierarchical Modeling and Adaptive Clustering for Real-time Summarization of Rush Videos", http://www.ist-live.org/intranet/school-of-informatics-university-of-bradford001-29/.
Google Latitude location history—http://www.google.com/latitude/apps/history (accessed Aug. 19, 2010).
Loecher, M., et al. "CitySenseTM: Multiscale Space Time Clustering of GPS points and trajectories", http://www.sensenetworks.com/pdf/JSM_Citysense.pdf.
Miller, James Allen. "Naggie Now Nudges BlackBerry 8800 Users," Apr. 18, 2007. http://www.blackberrytoday.com/articles/2007/4/2007-4-18-Naggie-Now-Nudges.html.
Daniel Ashbrook and Thad Starner "Using GPS to Learn Significant Locations and Predict Movement Across Multiple Users", Georgia Institute of Technology.
Gabriella Castelli, Marco Mamei, Alberto Rosi. "The Whereabouts Diary" Università di Modena e Reggio Emilia.
John A. Flanagan "Context Awareness in a Mobile Device: Ontologies Versus Unsupervised/supervised Learning" Nokia Research Centre.
Jeffrey Hightower et al. "Learning and Recognizing the Places We Go" Intel Research Seattle.
Kari Laasonen, Mika Raento and Hannu Toivonen "Adaptive On-Device Location Recognition," Basic Research Unit, Helsinki Institute for Information Technology, Department of Computer Science, University of Helsinki.
Nicole Bicocchi et al. "Supporting Location-Aware Services for Mobile Users with the Whereabouts Diary" Dipartimento di Scienze e Metodi dell'Ingegneria—Università di Modena e Reggio Emilia.
Summons to Attend Oral Prceedings dated Apr. 2, 2015, issued on Corresponding European Patent Application No. 10175191.5.

* cited by examiner

METHOD AND APPARATUS FOR GENERATING AND USING LOCATION INFORMATION

CROSS-REFERENCE TO RELATED APPLICATIONS

This is the first application filed for the present technology.

TECHNICAL FIELD

The present disclosure relates generally to mobile electronic devices and, in particular, to techniques for generating meaningful location identifiers based on a location history of the mobile electronic device, and of using same.

BACKGROUND

Mobile electronic devices, including mobile wireless communication devices such as cellular telephones, smartphones, handheld PDAs, and the like, are often capable of determining their current location. One or more technologies may be used for location determination, including satellite-based positioning systems such as the Global Positioning System (GPS), positioning systems based on terrestrial wireless signals such as cell tower signals or wireless network signals, or other techniques, such as deadreckoning, inertial navigation, or the like. Device location may be used in providing location-based services, for navigation, or for other purposes.

Device location history may be automatically collected over time and analyzed to extract information. Some applications perform analysis of the location history, for example to determine locations where the mobile device appears to stay for a period of time. Furthermore, some applications have been proposed which attempt to automatically assign semantic meaningful tags to certain locations. See, for example, "The Whereabouts Diary," G. Catelli, M. Mamei and A. Rosi, Lecture Notes in Computer Science: Location- and Context-Awareness, Vol. 4718, 2007. However, such approaches may be complex, error-prone and time and resource intensive.

Therefore, there is a need for a method and apparatus for generating and using location information that is not subject to one or more limitations of the prior art.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

The present technology generally provides a method, mobile device and computer program product for generating location information.

Accordingly, an aspect of the present technology is a mobile device comprising a positioning module and a processing module in operative communication described as follows. The positioning module is configured to obtain a location history of the mobile device, for example via satellite-based positioning, terrestrial wireless signal-based positioning, or the like, or a combination thereof. The processing module is configured to obtain and process the location history to determine one or more locations of significance. The processing module is further configured to generate, for at least one of the locations of significance, a set of one or more potential location identifiers associated therewith. The processing module is further configured to determine an appropriate time to prompt for user input regarding said at least one of the locations of significance. The user input may be used for refining the set of one or more potential location identifiers into a customized location identifier. The processing module is further configured to prompt for said user input at the determined appropriate time.

Yet another aspect of the present technology is a method for generating information based at least in part on a location history of a mobile device. The method comprises obtaining the location history of the mobile device, and processing the location history to determine one or more locations of significance. The method further comprises, for at least one of the locations of significance: automatically generating a set of one or more potential location identifiers associated with at least one of the locations of significance; determining an appropriate time to prompt for user input regarding said at least one of the locations of significance, said user input for refining the set of one or more potential location identifiers into a customized location identifier; and prompting, at the determined appropriate time, for said user input.

Another aspect of the present technology is a computer program product comprising code adapted to perform acts associated with the foregoing method when the code is loaded into memory and executed on a processor of a mobile device.

The details and particulars of these aspects of the technology will be described below, by way of example, with reference to the attached drawings.

Figure 1:
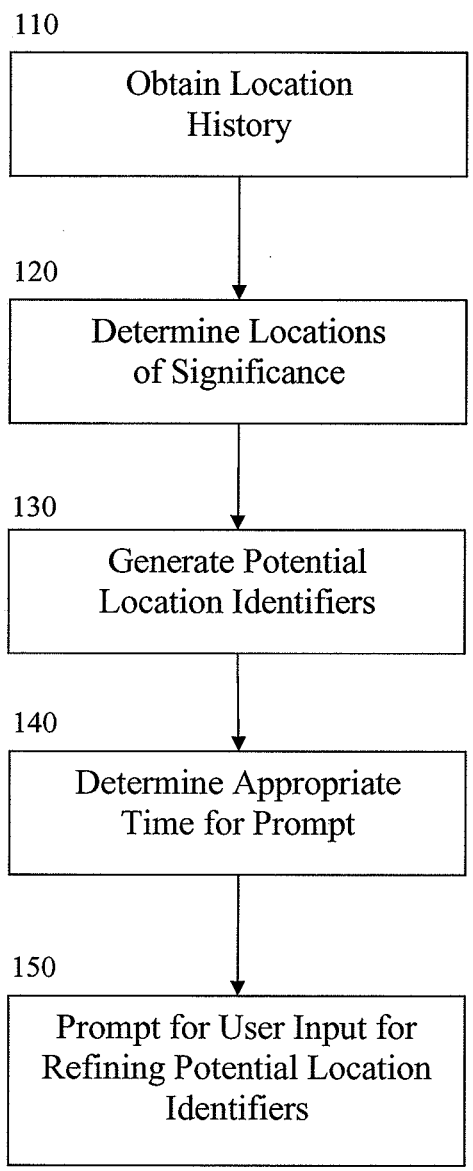
FIG. 1 illustrates a method for generating information based at least in part on a location history of a mobile device in accordance with embodiments of the present technology.

FIG. 1 illustrates a method 100 for generating information based at least in part on a location history of a mobile device. The method comprises obtaining 110 the location history of the mobile device. For example, current location data may be acquired at a series of times, possibly along with a timestamp, via a GPS or terrestrial-based positioning module. The current location data may be used to generate a location history, which may be stored directly as a list of locations, or stored as parametric data corresponding to a model such as a Gaussian mixture model, the parameterized model representative of the location history.

The method 100 further comprises processing 120 the location history to determine one or more locations of significance. The location history may be processed based at least in part on a schedule, in response to one or more events, or the like, or a combination thereof. Processing may be recursive, for example, a current location history may be updated based on new location information. Processing may comprise determining or updating significance of one or more locations, adding or deleting potential locations of significance, or the like. In some embodiments, processing 120 may comprise performing a clustering algorithm to determine one or more potential locations of significance from a collection of location data points.

The method 100 further comprises, for at least one of the locations of significance: automatically generating 130 a set of one or more potential location identifiers, such as semantic tags, associated with at least one of the locations of significance. Potential location identifiers may be generated from a predetermined list or from user information stored in memory. Automatic generation of potential location identifiers may be used, for example, to generate a shortlist which is later refined in accordance with user input into one or more customized location identifiers.

The method 100 further comprises determining 140 an appropriate time to prompt for user input regarding said at least one of the locations of significance, said user input for refining the set of one or more potential location identifiers into one or more customized location identifiers. Determining an appropriate time may be based on user behaviour patterns, likely location type, current location, proximity in time or space to the location of significance, or the like, or a combination thereof.

The method 100 further comprises prompting 150, at the determined appropriate time, for said user input. For example, when the mobile device is in such a location, it may prompt the user with a question such as "where are you now?," "are you currently in/at location X?," or the like. Users may be given a choice of responses to such a prompt, for example in the form of a yes or no answer, a list of potential location identifiers, or the like.

Acts associated with the method described herein can be implemented as coded instructions in a computer program product. In other words, the computer program product is a computer-readable medium upon which software code is recorded to execute the method when the computer program product is loaded into memory and executed on the microprocessor of the mobile device.

The method described herein can be implemented on a mobile device having appropriate communication capabilities, such as voice communication capabilities, data communication capabilities, or a combination thereof. The term "mobile device", for the purposes of this specification, shall include any wireless handheld, smart phone, PDA, tablet, laptop, netbook, or other communications device that is capable of transmission and reception of data via a wireless communication medium such as radio.

Figure 2:
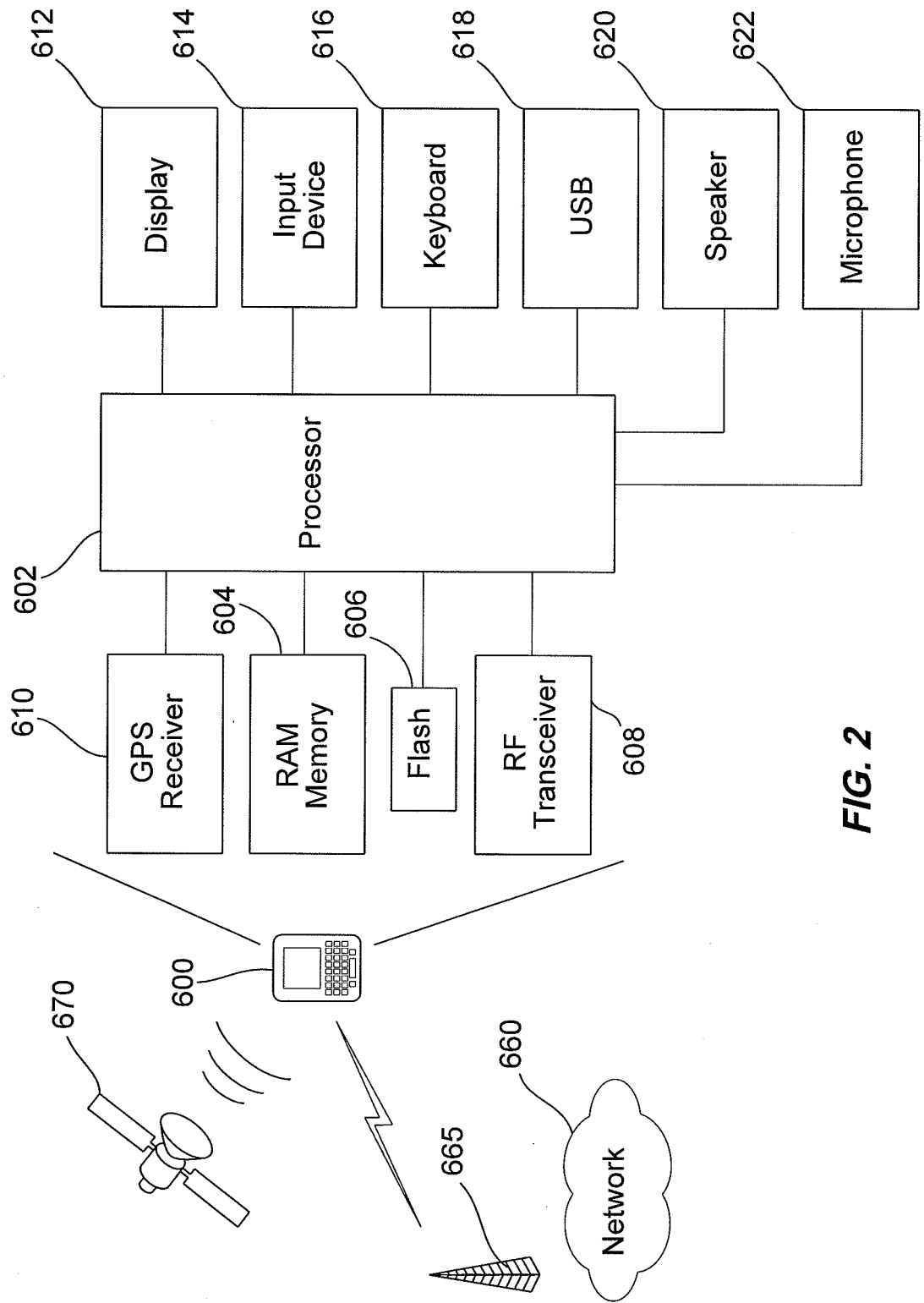
FIG. 2 illustrates a block diagram of an exemplary mobile device.

FIG. 2 is a block diagram depicting certain main components of an exemplary mobile device 600. It should be understood that this figure is intentionally simplified to show only certain components; the device 600 may include other components beyond those shown in FIG. 2. The device 600 includes a microprocessor 602 (or simply a "processor") which interacts with memory in the form of RAM 104 and flash memory 106 to enable a variety of device functions and to execute an operating system for running software applications loaded on the device.

The microprocessor 602, RAM 604 and flash memory 606 may form at least part of a processing module of the mobile device, configured to store and process location history, generate potential location identifiers, determine an appropriate time for prompting for user input for refining the potential location identifiers into a customized location identifier, and directing user interface components in such prompting and receiving responses to said prompting.

The device 600 includes a radiofrequency (RF) transceiver 608 for communicating wirelessly with a base station 665 of a wireless network 660, or alternatively or additionally for communicating directly with another peer device such as a mobile device, for example as may occur in some ad-hoc networks. The base station 665 may be a cellular base station, Base Transceiver Station (BTS), Node B, wireless access point, or the like. The base station 210 may change as the mobile device travels. The RF transceiver includes a wireless communication channel for transmitting and receiving data. The RF transceiver may further include a wireless voice channel for transmitting and receiving voice communications, for example concurrently with transmission and reception of data over the same or a separate logical or physical channel.

The device 600 optionally includes a GPS receiver chipset 610 as a positioning module for receiving GPS radio signals transmitted from one or more orbiting GPS satellites 670. The GPS receiver chipset 610 can be embedded within the device or externally connected, such as, for example, a "Bluetooth" GPS puck or dongle. Other positioning modules may also be used in place of GPS, as would be readily understood by a worker skilled in the art. For example, terrestrial positioning systems based on wireless signal triangulation, trilateration, angle-of-arrival, time-of-arrival, and the like, may be used in addition to or instead of GPS or other satellite-based positioning systems.

In terms of input/output devices or user interfaces (UI's), the device 600 typically includes a display 612 (e.g. a small LCD screen), a thumbwheel and/or trackball 614, a keyboard 616, a USB 618 or serial port for connecting to peripheral equipment, a speaker 620 and a microphone 622. The device's display 612 may optionally include a touch screen input device. A user interface module may comprise one or more user interfaces along with appropriate processing capabilities using a microprocessor, or the like, the user interface module configured in a predetermined manner.

The mobile device 600 sends and receives communication signals via the RF transceiver 608. A wireless communication module, including the RF transceiver 608 and components or portions thereof operatively coupled to the RF transceiver 608, is provided for contacting and communicating with other devices via a wireless network. When communicating wirelessly with a base station 665 of a wireless network 660, the device 600 may communicate in accordance with one or more appropriate technologies such as: Global Systems for Mobile communications (GSM), General Packet Radio Service (GPRS), Code Division Multiple Access (CDMA) technologies, Wideband CDMA (WCDMA), whether 2G, 3G, High speed packet access (HSPA), Universal Mobile Telecommunication System (UMTS) based technologies, Long Term Evolution (LTE) technologies, Orthogonal Frequency Division Multiplexing (OFDM) technologies, Ultra-Wideband (UWB) technologies, Wi-Fi or WiMAX technologies, or other communication technologies and protocols as would readily be understood by a worker skilled in the art.

In some embodiments, the mobile device 600 may be capable of operation using multiple protocols. The base station 665 may be part of a wireless network, such as a cellular network, local-area network, wide-area network, wireless hotspot network, or the like. The mobile device, base station, network components, and the like, may be configured for data communication, voice communication, or a combination thereof, possibly using additional components, configurations and procedures where appropriate, such as SIM cards, UICCs, authorization and authentication procedures, handoff procedures, and the like, as would be readily understood by a worker skilled in the art.

A positioning module of the mobile device 600 may comprise the GPS receiver chipset 610, the RF transceiver 608, or both. Location readings, such as latitude and longitude readings, may be obtained from the GPS receiver chipset 110 as would be readily understood by a worker skilled in the art. Location readings may additionally or alternatively be obtained via the RF transceiver using terrestrial signals. For example location readings may be obtained by triangulation or trilateration of plural cell tower signals or wireless local area network signals originating from known locations, for example by determining time difference of arrival or angle of arrival of wireless signals, or by determining proximity to one or more cell towers or wireless network base stations, correlated to known locations by way of identity signals transmitted by the cell towers or base stations, or the like. For example, wireless local area network (WLAN) positioning or location fingerprinting may be used, as would be readily understood by a worker skilled in the art. The positioning module may comprise or utilize the microprocessor 602, RAM 604 and flash memory 606, for example to process location data for location into the location history, which may be stored in memory as a compressed or uncompressed list, parameterized model, or the like.

Figure 3:
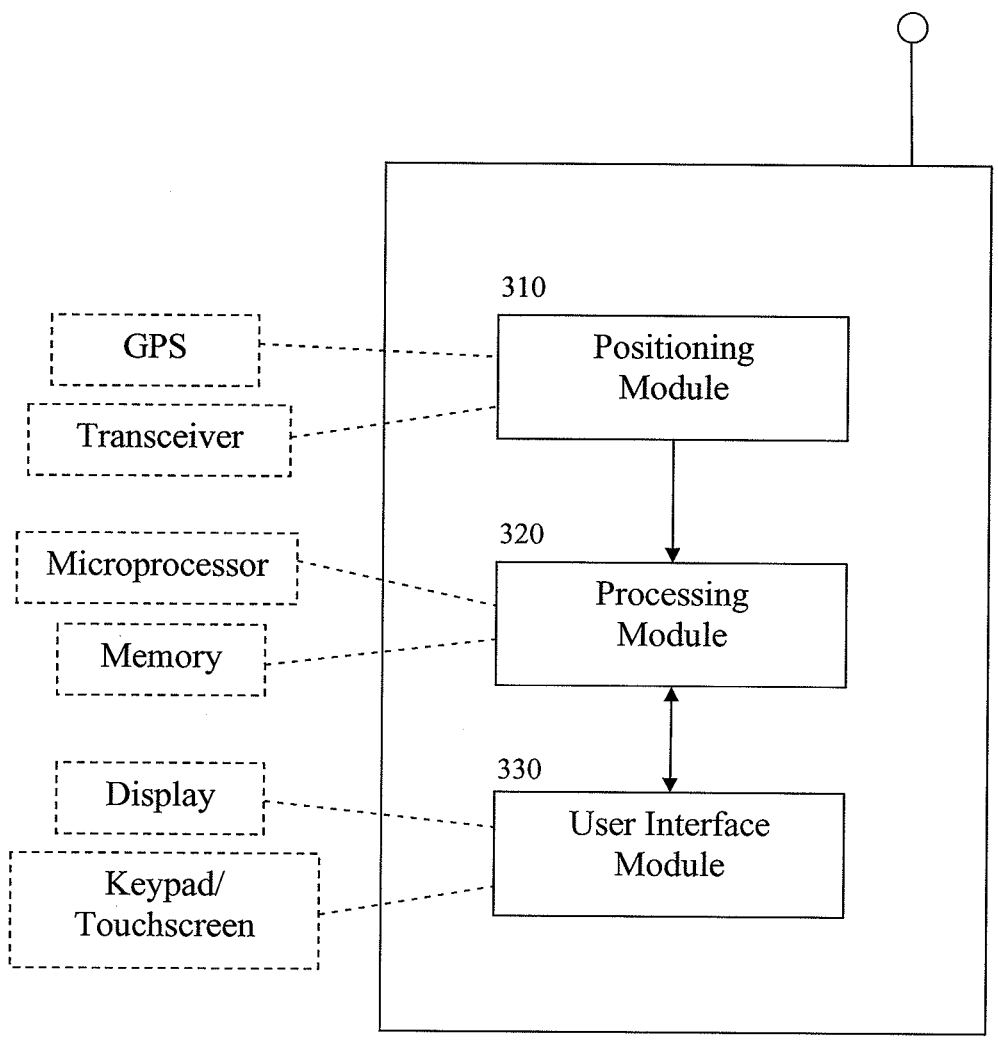
FIG. 3 illustrates a block diagram of a mobile device in accordance with embodiments of the present technology.

FIG. 3 illustrates a mobile device 300 configured in accordance with embodiments of the present technology. The mobile device comprises a positioning module 310, a processing module 320 and a user interface module 330.

The positioning module 310 may be configured to periodically obtain current location data for updating a location history stored in memory of the mobile device, for example via GPS readings, via reading and interpreting terrestrial wireless signals received from a wireless transceiver, or the like. The positioning module may comprise or be operatively coupled to a radio receiver for this purpose, such as a GPS or wireless receiver. The positioning module may further comprise or be operatively coupled to a processor for processing the location history, for example to integrate location data, and memory for storing the location history.

The processing module 320 comprises a microprocessor operatively coupled to memory, and is configured to execute program instructions for processing the location history, generating potential location identifiers and other information, and triggering prompting for user input for refining the list of potential location identifiers via a user interface 330. The user interface 330 may comprise a video screen, keypad, touchscreen, or the like, for conveying information to and from a user of the mobile device 300.

Obtaining Location History

Location data may be acquired periodically, randomly, in accordance with a schedule, or the like. A collection of location data may be integrated into the location history, stored in memory and updated upon acquisition of new location data. In some embodiments, the location history is stored directly to memory, possibly compressed, but such that each original location data point may be substantially recovered.

In some embodiments, location data is used to generate or update a location history represented as model data, such as data corresponding to a Gaussian Mixture Model (GMM). The location history may be stored as a set of parameters of a predetermined model representing location history, for example means, variances and weights of a plurality of Gaussians comprising a GMM, or other parameters indicative of locations where the mobile device has been.

The location history may be stored on the mobile device, thereby enhancing privacy. Due to potentially limited memory storage, the location history may be stored in compressed format. Representing location history via a simplified model, such as a Gaussian mixture model, may facilitate such compression, however other compression formats readily known to a worker skilled in the art may be used.

The location history may be obtained over time by acquiring and integrating sequential location readings from a positioning module. Location readings may be obtained from a GPS system or other satellite-based positioning system, a positioning system operating based on terrestrial wireless signals, as described herein, or the like, or a combination thereof. Location readings may comprise latitude and longitude coordinates.

In some embodiments, a location reading may be triggered by a GPS dropout for at least a predetermined period of time, in which it is detected that GPS satellite signals are not being received, thereby indicating that the mobile device has moved indoors. The location reading may thus comprise the last detected location before the GPS dropout.

Individual location readings may be associated with a timestamp, which may be incorporated into the location history. The location history may further comprise or be associated with other captured and recorded information, such as availability of wireless connections such as Wi-Fi™ or Bluetooth™ at visited locations; information related to user activity, behaviour or preferences at visited locations, for example as indicated by mobile device settings, mobile device applications accessed, ringer level settings, and the like; information obtained from sensors at visited locations; media data status; or the like, or a combination thereof.

In some embodiments, a mixture model, such as a Gaussian mixture model, may be used to represent location history. The mixture model may be updated over time with new location data points, and may optionally be updated to discard information corresponding to old or expired data points, to give less weight to older data than newer data, or the like.

For example, a Gaussian mixture model (GMM) may be represented as a sum of N possibly multidimensional Gaussian distributions. The model may be represented as a set of N tuples $\{(a_n, \mu_n, \theta_n): n=1, 2, \ldots N\}$, where $a_n$ represents a weighting factor for the $n^{th}$ Gaussian, $\mu_n$ represents a mean for the $n^{th}$ Gaussian, and $\theta_n$ represents a variance or covariance matrix for the $n^{th}$ Gaussian. Each Gaussian may be a two-dimensional distribution over latitude and longitude coordinates, centered around a geographic mean. The geographic mean may, for example, correlate with a location frequently visited by the mobile device.

The weights $a_n$ may represent relative importance of each Gaussian. For example, if the weights $a_1$ to $a_N$ sum to one, then the GMM may be interpreted as representing the long-run proportion of time spent in different geographic locations, or the probability of observing the mobile device in a given geographic location at a randomly selected time.

In some embodiments, the GMM may be generated or updated from location data points as they are acquired. GMM parameters which "best fit" the location history may be generated, for example in accordance with a clustering algorithm which may be based for example in the expectation-maximization (EM) algorithm, a k-means algorithm, hierarchical clustering, principal component analysis, spectral analysis, competitive learning, or the like. Such algorithms may be applied recursively, so that an existing GMM may be updated with new location data points without having to re-compute the entire GMM.

In some embodiments, other approaches may be used to model location history. Location history may be used in generating a parametric model via a recursive algorithm, neural network, or the like.

In some embodiments, a location may be a mobile location. For example, a set of locations along a road and travelling within a predetermined range of speeds may be associated with the location "in a car." A set of locations along the same road but travelling within different ranges of speeds or with different speed patterns may similarly be associated with the location "on foot," "on bicycle," or "on a bus."

Determining Locations of Significance

The location history may be recursively or non-recursively processed to determine one or more locations of significance. For example, the location history may be processed to determine the N most significant locations, for a predetermined integer N, or locations having a significance score exceeding a predetermined value. Locations of significance may be selected from plural recognized potential locations of significance, each for example corresponding to a peak in a map of visit frequency versus latitude and longitude coordinates. Recognizing potential locations of significance may comprise performing clustering analysis or other analysis on the location history, or otherwise extracting locations from the location history model based on predetermined criteria such as dwell time, frequency of visits, and the like.

Each potential location of significance may be associated with a scalar or vector significance value assigned thereto, which is computed based on one or more observations obtained by the mobile device, and which may be used to rank potential locations of significance and select actual locations of significance therefrom.

Significance may be based on one or more factors such as: time spent at location in a predetermined recent past, cumulative or overall time spent in a location, average time spent in a location i.e. dwell time, use of mobile device at a location, regularity of visits to a location, or the like, or a combination thereof. For example, in one embodiment, the N most recently visited locations, or the N locations most recently visited more than twice for more than 10 minutes per visit, may be determined to be the N most significant locations. In some embodiments, the number of observations corresponding to a location may be used as a surrogate for time spent in that location.

In some embodiments, significance values may be computed, and locations of significance may be selected, based at least in part on the availability of potential location identifiers for a location or other factors related to ease of automatic tagging, manual tagging, or both. For example, significance value for a location may increase if a coherent list of location identifiers can be automatically generated for that location, if a user is deemed more likely to participate in tagging for that location, if the location is expected to be more meaningful to a user, or the like. For example, if the mobile device is used more often at a location, the significance value may be increased. This may make embodiments of the present technology more "user friendly."

In some embodiments, locations of significance may be associated with one or more means $\mu_n$ of a Gaussian mixture model, for example corresponding to one or more of the highest values of weights $a_n$, such weights configured to confer significance to each mean $\mu_n$.

In some embodiments, previously identified locations of significance may be discarded when predetermined conditions have been met. For example, if a location has an absolute or relative significance value below a predetermined threshold, then it may be suspended or discarded. This may occur if a location has not been visited for a predetermined amount of time, if it is not visited as frequency as other locations of significance, or the like. In some embodiments, the present technology may be configured to keep the top N locations of significance, and discard other locations. In some embodiments, a prompt may be displayed, prompting a mobile device user to confirm or deny a proposed discard.

In some embodiments, potential locations of significance may be identified at least in part by GPS dropouts, or by recognition of limited areas in which the mobile device spends an extended period of time, for example more than 10 minutes.

Generating Potential Location Identifiers

Embodiments of the present technology are configured to automatically generate, for at least one of the locations of significance, a set of one or more associated potential location identifiers such as semantic tags. The potential location identifiers may be generated by selecting one or more likely identifiers from a predetermined list, for example based on time of day or user behaviour, by analyzing user-generated information stored in mobile device memory, for example associated with sources such as emails, calendars, appointment books, or the like, or a combination thereof. Potential location identifiers may be ranked according to accuracy likelihood, descriptiveness, expected likelihood of being selected by a user, expected meaningfulness to a user, or the like.

For example, information correlated with the location of interest may be analyzed to generate a list of keywords which may be repeated with high frequency, descriptive of location, descriptive of activities associated with a location, or the like. These keywords may be processed and categorized to generate a list of potential location identifiers, with redundancies substantially reduced or removed.

In some embodiments, once a location of significance has been identified, the mobile device may increase monitoring of user input related to the location of significance to thereby generate and evaluate potential location identifiers. This may comprise monitoring and analysis of user input when the user is at or near the location of significance, analysis of locations visited prior to or subsequently to the location of significance, analysis of entries in appointment books, schedules, or the like, which comprise details regarding user activity during times when the location of significance is visited, and the like.

In some embodiments, potential location identifiers may be automatically selected from a predetermined list, based on automatically generated information indicative of factors such as mobile device user behaviour or preferences, or pattern of movement of the mobile device. For example, if the user regularly spends nights in a certain location, that location may be identified as "home."

Prompting for User Input

Embodiments of the present technology relate to determining an appropriate time to prompt for user input regarding said at least one of the locations of significance, and prompting, at the determined appropriate time, for said user input. The user input may be used for refining the set of one or more potential location identifiers into a customized location identifier, for example by selecting one or more potential location identifiers from a list, answering a series of yes-or-no questions, or the like.

In some embodiments, an appropriate time may be determined as being during or near a time when the mobile device is in or proximate to a location of significance for which a customized location identifier is to be generated. In some embodiments, an appropriate time may be determined at least in part based on a determination of likelihood that the user will respond to a prompt from their mobile device. For example, if the ringer is turned off or the location of significance has at least a threshold likelihood of being a movie theatre, boardroom, or other sensitive venue, a prompt may be deferred. As yet another example, an appropriate time may be determined based on user patterns of activity. For example, a time may be deemed as appropriate when the user has just completed a call, is using the device to check appointments or browsing the Internet, or the like.

In some embodiments, an appropriate time may be based at least in part on a determination of whether the list of potential location identifiers to be presented to the user is adequate. For example, the mobile device may defer prompting the user unless at least one potential location has been generated which can be proposed to the user in a prompt.

In some embodiments, when the mobile device is in a location of significance for which a customized location identifier is to be determined, it may prompt the user, via an output user interface, with a question such as "where are you now?" followed by a list of likely locations as potential location identifiers, one or more of which may be selected by user input. As another example, the mobile device may prompt the user with a question such as "are you currently in/at location X?" where location X is a potential location identifier. User input in the form of a yes or no answer may be used to confirm or reject location X as a customized location identifier. In addition, likelihood scores of other potential location identifiers may be adjusted based on such user input.

In some embodiments, potential location identifiers may be organized in a tree-format, such that when one is selected by the user, a sub-list of identifiers may be presented which offers a refined set of options for user selection. This may facilitate convenient user selection of a customized location identifier through a short sequence of selections.

In some embodiments, a user may be presented with an option to enter a customized location identifier in a free-form manner, for example without necessarily being constrained by a list of potential identifiers. For example, the mobile device may provide an option to override the list of machine-generated potential location identifiers and enter their own customized location identifier.

In some embodiments, customized location identifiers may be restricted to a predetermined master list. The master list may be configured so as to contain an acceptably wide variety of descriptive location identifiers. The use of a master list may simplify the task of generating location identifiers that are both meaningful to a user and meaningful, categorizable and/or parseable by the mobile device or an application running thereon.

Application Integration

Embodiments of the present technology may be configured to use generated location identifiers for one or more applications.

In some embodiments, once a location has been identified and associated with a meaningful tag, namely a location identifier, the mobile device may be configured to generate and present alerts when the user approaches that location in the future. Such alerts may comprise a reminder to the user of a task to be performed involving the location. Such alerts may comprise text messages, emails, status updates, or other messages viewable by predetermined user contacts, informing them that the user appears to be going to a location of interest.

For example, the mobile device may be configured with a "to-do list" application, wherein a user may enter activities to be performed and associated location identifiers. When the mobile device detects it is nearing a location corresponding to a location identifier in the to-do list, a prompt is presented to remind the user of the associated activity to be performed.

As another example, when the mobile device is detected as nearing a restaurant corresponding to a location identifier, which the mobile device user regularly frequents, an order may be sent to the restaurant, or a predetermined group of contacts may be invited to the restaurant, or the like. The present technology may thereby be configured for driving social applications.

In some embodiments, properties of the mobile device, such as user interface, enabled features, active radios, operating conditions, and the like, may be adjusted based on current location. For example, when a user is at a home or leisure location, their home screen or shortlist of easily accessible applications or contacts may be modified to contain applications more likely to be selected by the user in that location. Likewise, when the user is at a work location, the homescreen or other aspects of the user interface may be changed to make work-related applications more prominent. As another example, if it is determined that the user does not typically use Bluetooth™ applications while in their home or another location, a Bluetooth™ radio module of the mobile device may be switched off while the mobile device is at the location identified as "home."

In some embodiments, location identifiers may be shared between mobile devices. Mobile devices belonging to a predetermined group may thereby share a set of common meaningful locations. In some embodiments, such mobile devices may also share their location, for example such that users of each mobile device may be informed, via a common location identifier, of where other mobile devices within the group are.

In some embodiments, the mobile device may be configured to respond to one or more queries regarding locations of significance. For example, the mobile device may be configured to respond to a query with a list of locations of significance sorted in order of importance, for example based on previously computed significance values or based on another metric, such as frequency or regularity of visits, recent visits, visits during predetermined periods such as weekends, or the like. The mobile device may be configured with a local or remote interface for receiving and responding to such local or remote queries.

In some embodiments, the present technology may retrieve potential location identifiers from applications such as tagging of user-generated media such as photos. For example, when a user tags a photo taken by the mobile device at a potential or actual location of significance, one or more potential location identifiers may be automatically generated based on the tag. Conversely, customized location identifiers previously generated may be used to automatically tag photos taken by the mobile device in a corresponding location of significance.

As the preceding illustrates, embodiments of the present technology may be integrated with other applications, so that assignment of location identifiers may rely on user input from other applications executed on the mobile device, and also inform input directed to said other applications.

Figure 4:
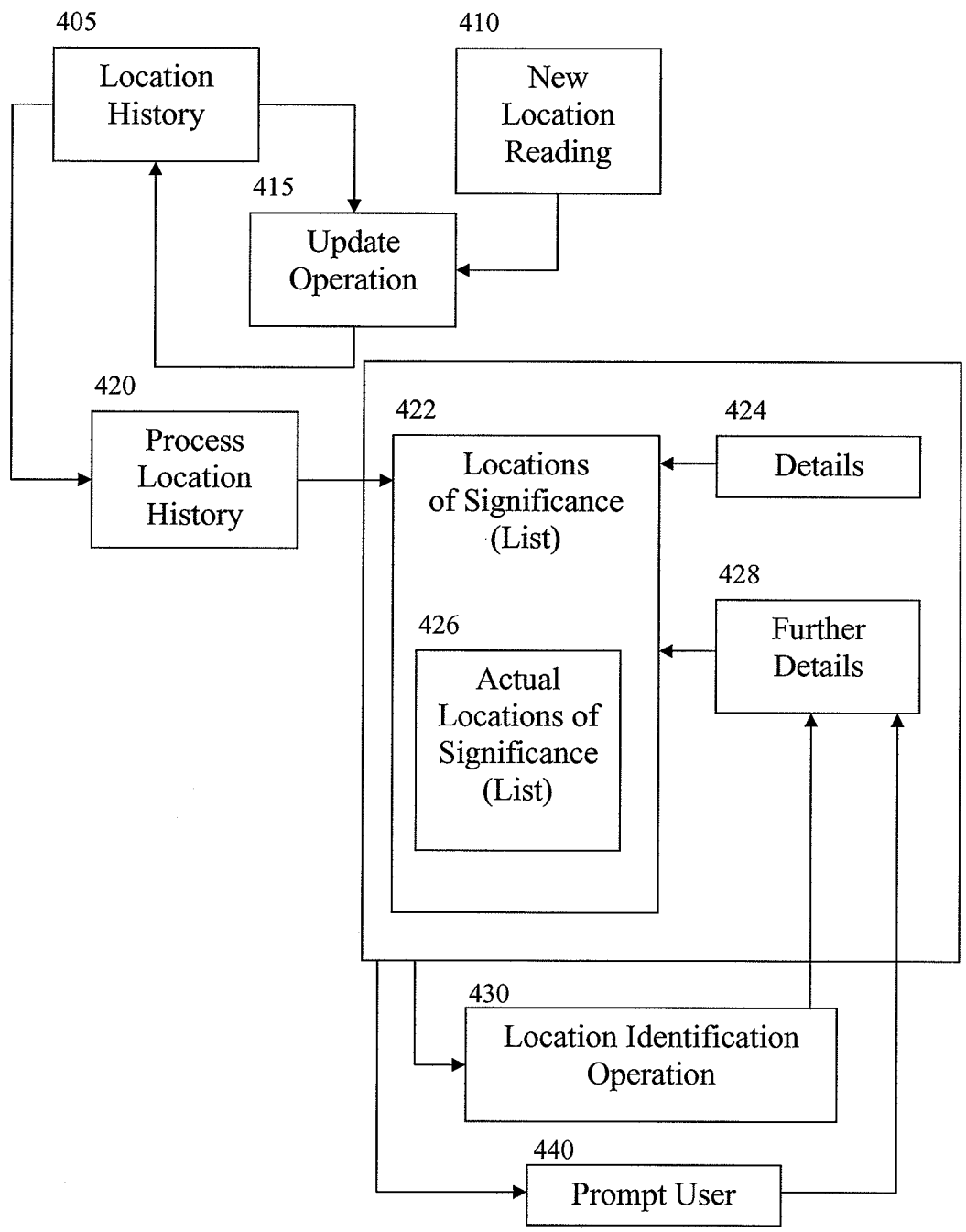
FIG. 4 illustrates operations of a mobile device, method or computer program product in accordance with embodiments of the present technology.

Implementations of the present technology will now be further explained with regard to the example scenario presented in FIG. 4. It should be expressly understood that these scenarios are only examples that are provided solely for the purposes of illustrating how the technology works in certain circumstances. Accordingly, these examples should not be construed as limiting any of the aspects of the technology already described above and claimed in the appended claims.

Consider first the example scenario depicted schematically in FIG. 4. A location history 405 is stored in memory of a mobile device, for example as a list of timestamped locations or as model data representative of a processed version of location history. The mobile device periodically generates location readings 410 indicative of current latitude and longitude of the mobile device. The location readings 410 are incorporated into the location history during an update operation 415. In some embodiments, the update operation 415 may comprise appending new location readings 410 to a list. In some embodiments, the update operation 415 may comprise retrieving the location history 405 model data, updating the location history 405 model data to incorporate the new location readings 410, and storing updated location history 405 model data in memory.

For example, the location history 405 may be stored as parameters of a predetermined type of mixture model, and the update operation 415 may comprise updating the stored parameters in accordance with the new location readings 410. For example, in a GMM, the update operation may comprise updating one or more weights, means and covariance matrices corresponding to one or more Gaussians, adding or deleting one or more Gaussians, or the like.

In some embodiments, the update operation 415 may comprise evaluating the new location readings 410, and updating, as necessary, a location history 405 representative of a map of locations visited over time. The location history 405 may be indicative of one or more discrete locations which are visited more frequently, possibly weighted according to how recent the visits are, how long the mobile device spends in each location, or the like. The location history 405 may track locations that have been visited for at least a predetermined period of time within a predetermined period of the past. Importance values assigned to such locations may increase with one or more factors such as frequency of visits, time since last visit, duration of visit, and the like.

The location history 405 may be processed 420 to determine one or more potential and actual locations of significance, for example periodically or concurrently with each update operation 415. Processing 420 may comprise updating a previously generated and stored list 422 of potential and actual locations of significance. For example, for location history stored as parameters of a GMM, determining locations of significance may comprise selecting one or more locations corresponding to means of Gaussians in the GMM associated with high mixture model weights. Processing 420 may comprise retrieving data, stored in the location history 405, indicative of potential and actual locations of significance. In this case, the stored list 422 may be implicitly or explicitly incorporated into the location history 405, however it is represented as a separate entity in FIG. 4 for ease of exposition.

In some embodiments, each location in the stored list 422 of potential and actual locations of significance may be associated one or more details 424, such as a range of geographic coordinates corresponding to the location, a significance value assigned to the location relative to other stored locations, information indicative of visitation history, such as last visit to the location, recent and overall frequency of visits, weekly regularity of visits, times of day, week, month or year that the location is visited with increased frequency, and the like. The details 424 may be implicitly or explicitly stored in a dedicated memory location, or as part of the location history 405, and possibly extracted by a predetermined function as needed.

In some embodiments, each location in the stored list 422 may comprise an indication of whether the location is currently deemed a location of significance, for example if it is associated with an absolute or relatively high significance value determined in accordance with a predetermined evaluation function. The current list of locations of significance may be stored as a subset 426 of the list 422. Each entry in the subset 426 may be further associated with further details 428, such as a list of one or more potential location identifiers that have been automatically generated for the location. Further details 428 associated with a location may also comprise indications of functions accessed while the mobile device is at the location, user preferences, settings and behaviour corresponding to the location, or the like. Further details 428 may also comprise other information, such as a history of attempts to prompt the user for input for refining the set of potential location identifiers into a customized location identifier, customized location identifiers provided by the user, links to locations with a significant probability of being visited prior to or subsequent to the location, details on Wi-Fi™ or Bluetooth™ device usage at the location, details regarding actions to be automatically performed by the mobile device when it is at or near the location, and the like.

The further details 428 in general, and the potential location identifiers in particular, may be automatically generated at least in part by a location identification operation 430. The location identification operation 430 may comprise one or more operations for generating potential location identifiers or semantic tags for each location of significance. Operations may include searching calendars or appointment books stored or accessible to the mobile device for entries corresponding to times when the mobile device is at geographic coordinates corresponding to the location of significance, and extracting keywords, nouns or other descriptive language which may be used as or associated with a potential location identifier. Operations may include searching pictures stored on the mobile device which tagged with geographic coordinates corresponding to the location and extracting keywords from other tags in the picture. Operations may include searching publicly-accessible databases or networks for semantic tags corresponding to geographic coordinates of the location of significance. Other operations may similarly be performed, generally directed toward automatic data mining of user-generated content for semantic tags or other potential location identifiers. Operations may include generating location identifiers from a predetermined list of likely location identifiers given the time of day, applications run on the mobile device, prior and subsequent locations, and the like.

The potential location identifiers generated in accordance with the location identification operation 430 may form a basis for a prompt 440 for user input for refining the potential location identifiers into a customized location identifier, via a user interface of the mobile device. The prompt may be displayed on a mobile device screen, at a determined appropriate time, for example when the user is at or near the location, a satisfactory list of potential location identifiers is available, and the user deemed is interacting or likely to interact with the mobile device to respond to the prompt. The prompt 440 may comprise a single, flat list of selectable potential location identifiers displayed to the user for selection, a series of nested lists of selectable potential location identifiers displayed to the user for navigation, one or more yes-or-no questions, or the like. The prompt provides output for display by the user interface and scans for input from the user interface in response to the output, the input for generating one or more customized location identifiers. Customized location identifiers are thereby selected with user participation so as to make them meaningful to the user. The customized location identifiers, or other results of the prompt such as indications of user non-responsiveness, may be stored in memory along with other further details 428. To lower demands on the user and improve user experience, information is automatically generated before the prompting phase.

Although in some implementations of the present technology GPS receivers are used to determine the current location of each device, it should be appreciated that other techniques can be used to determine the current location to a degree of accuracy commensurate with the technique used. For example, cell tower triangulation or radiolocation techniques, as mentioned above, can be used to generate the current location for the device. Alternatively, the identity (and location) of the cell tower handling the device's communications can be used as a proxy for the location of the device. Another approach would be to prompt the user of the device to enter his or her current location (e.g. entering a street address, picking a point from a map or selecting the current location using crosshairs on a map). As yet another example, Global Navigation Satellite Systems (GNSS) or pseudo-satellite systems other than or in addition to the currently deployed GPS system may be used. For example, GLONASS, Beidou, COMPASS, Galileo, or like systems may be utilized for positioning. Satellite-based, regional, or network-based augmentation or improvement systems such as WAAS and A-GPS may also be utilized to aid in positioning.

This new technology has been described in terms of specific implementations and configurations (and variants thereof) which are intended to be exemplary only. The scope of the exclusive right sought by the applicant is therefore intended to be limited solely by the appended claims.

The invention claimed is:

1. A mobile device comprising:
   a display;
   a memory;
   a positioning module configured to obtain a location history of the mobile device and store, in the memory, the location history as a set of parameters of a predetermined location history model;
   a processor operably coupled to the display and the memory and configured to:
      process the set of parameters of the predetermined location history model to determine one or more locations of significance, wherein the location history is stored in the memory as a set of parameters of a Gaussian Mixture Model (GMM), the GMM comprising a plurality of Gaussians, each Gaussian having a weighting parameter associated therewith, and wherein determining the one or more locations of significance comprises selecting one or more locations corresponding to means of Gaussians in the GMM, which have weighting parameters of relative high values;
      generate, for at least one of the locations of significance, a set of one or more selectable potential location identifiers associated therewith;
      determine an appropriate time to prompt for user input regarding said at least one of the locations of significance based on one or more of: expected responsiveness of user to prompts, and a size of the set of one or more selectable potential location identifiers, said user input for refining the set of one or more selectable potential location identifiers into a customized location identifier;
      prompt, at the determined appropriate time for said user input, by displaying, on the display, at least one of the set of one or more selectable potential location identifiers for selection as the customized location identifier.

2. The mobile device according to claim 1, wherein determining the one or more locations of significance comprises recognizing one or more potential locations of significance, assigning significance values to the one or more potential locations of significance, and selecting the one or more locations of significance based at least in part on the significance values.

3. The mobile device according to claim 2, wherein the significance values corresponding to a location are based on one or more of: use of the mobile device at the location, availability of potential location identifiers for the location, expected responsiveness of a user to prompts at the location, and expected meaningfulness of the location to a user.

4. The mobile device according to claim 1, wherein generating the set of one or more potential location identifiers comprises one or more of: analyzing user generated information stored in the memory, selecting one or more identifiers from a list based on user behavior, and selecting one or more identifiers from a list based on pattern of movement of the mobile device.

5. The mobile device according to claim 1, wherein the location history is further associated with captured and recorded information related to one or more of: available wireless connections at one or more locations, user activity during times when a location of significance is visited, and user preferences at one or more locations.

6. The mobile device according to claim 1, wherein generating the potential location identifiers is informed at least in part by user input provided in association with a first set of applications of the mobile device, and the customized location identifier is used by a second set of applications of the mobile device.

7. The mobile device according to claim 1, wherein the customized location identifier is used by an application of the mobile device selected from the group comprising: applications for listing and sorting customized location identifiers, applications for adjusting a home screen or a shortlist of easily accessible applications or contacts based on proximity to a location of significance, applications for adjusting operating status of a short range radio based on proximity to a location of significance, and applications for tagging user-generated media.

8. A mobile device comprising:
   a display;
   a memory;
   a positioning module configured to obtain a location history of the mobile device and store in the memory the location history as a set of parameters of a predetermined location history model;
   a processing operably coupled to the display and the memory and configured to:
      process the set of parameters of the predetermined location history model to determine one or more locations of significance, wherein the location history is stored in the memory as a set of parameters of a Gaussian Mixture Model (GMM), the GMM comprising a plurality of Gaussians, each Gaussian having a weighting parameter associated therewith, and wherein determining the one or more locations of significance comprises selecting one or more locations corresponding to means of Gaussians in the GMM, which have weighting parameters of relative high values;
      generate, for at least one of the locations of significance, a set of one or more selectable potential location identifiers associated therewith;
      determine an appropriate time to prompt for user input regarding said at least one of the locations of significance, said user input for refining the set of one or more selectable potential location identifiers into a customized location identifier; and
      prompt, at the determined appropriate time for said user input by displaying, on the display, one or more of: at least one of the set of one or more potential location identifiers in a tree like format for selection; and one or more yes or no questions directed toward selection of one of the selectable potential location identifiers for selection as the customized location identifier.

9. The mobile device according to claim 8, wherein determining the one or more locations of significance comprises recognizing one or more potential locations of significance, assigning significance values to the one or more potential locations of significance, and selecting the one or more locations of significance based at least in part on the significance values.

10. The mobile device according to claim 8, wherein generating the set of one or more potential location identifiers comprises one or more of: analyzing user-generated information stored in memory, selecting one or more identifiers from a list based on user behavior, and selecting one or more identifiers from a list based on pattern of movement of the mobile device.

11. The mobile device according to claim 8, wherein the location history is further associated with captured and recorded information related to one or more of: available wireless connections at one or more locations, user activity during times when a location of significance is visited, and user preferences at one or more locations.

12. The mobile device according to claim 8, wherein generating the potential location identifiers is informed at least in part by user input provided in association with a first set of applications of the mobile device, and the customized location identifier is used by a second set of applications of the mobile device.

13. The mobile device according to claim 8, wherein the customized location identifier is used by an application of the mobile device selected from the group comprising:
applications for listing and sorting customized location identifiers, applications for adjusting a home screen or a shortlist of easily accessible applications or contacts based on proximity to a location of significance, applications for adjusting operating status of a short range radio based on proximity to a location of significance, and applications for tagging user-generated media.

14. A method for generating information based at least in part on a location history of a mobile device, the method comprising:
obtaining the location history of the mobile device;
storing, in memory, the location history as a set of parameters of a predetermined location history model;
processing the set of parameters of the predetermined location history model to determine one or more locations of significance, wherein the location history is stored in the memory as a set of parameters of a Gaussian Mixture Model (GMM), the GMM comprising a plurality of Gaussians, each Gaussian having a weighting parameter associated therewith, and wherein determining the one or more locations of significance comprises selecting one or more locations corresponding to means of Gaussians in the GMM, which have weighting parameters of relative high values; and
for at least one of the locations of significance:
automatically generating a set of one or more selectable potential location identifiers associated with at least one of the locations of significance;
determining an appropriate time to prompt for user input regarding said at least one of the locations of significance based on one or more of: expected responsiveness of user to prompts, and a size of the set of one or more potential location identifiers, said user input for refining the set of one or more potential location identifiers into a customized location identifier; and
prompting, at the determined appropriate time for said user input by displaying, on a display of the mobile device, at least one of the set of one or more selectable potential location identifiers for selection as the customized location identifier.

15. The method according to claim 14, wherein determining the one or more locations of significance comprises recognizing one or more potential locations of significance, assigning significance values to the one or more potential locations of significance, and selecting the one or more locations of significance based at least in part on the significance values.

16. The method according to claim 15, wherein the significance values corresponding to a location are based on one or more of: use of the mobile device at the location, availability of potential location identifiers for the location, expected responsiveness of a user to prompts at the location, and expected meaningfulness of the location to a user.

17. The method according to claim 14, wherein generating the set of one or more potential location identifiers comprises one or more of: analyzing user generated information stored in memory, selecting one or more identifiers from a list based on user behavior, and selecting one or more identifiers from a list based on pattern of movement of the mobile device.

18. The method according to claim 14, wherein the location history is further associated with captured and recorded information related to one or more of: available wireless connections at one or more locations, user activity during times when a location of significance is visited, and mobile device settings at one or more locations.

19. The method according to claim 14, wherein generating the potential location identifiers is informed at least in part by user input provided in association with a first set of applications of the mobile device, and the customized location identifier is used by a second set of applications of the mobile device.

20. The method according to claim 14, wherein the customized location identifier is used by an application of the mobile device selected from the group comprising: applications for listing and sorting customized location identifiers, applications for adjusting a home screen or a shortlist of easily accessible applications or contacts based on proximity to a location of significance, applications for adjusting operating status of a short range radio based on proximity to a location of significance, and applications for tagging user-generated media.

21. A method for generating information based at least in part on a location history of a mobile device, the method comprising:
obtaining the location history of the mobile device;
storing, in memory, the location history as a set of parameters of a predetermined location history model, wherein the location history is stored in the memory as a set of parameters of a Gaussian Mixture Model (GMM), the GMM comprising a plurality of Gaussians, each Gaussian having a weighting parameter associated therewith, and wherein determining the one or more locations of significance comprises selecting one or more locations corresponding to means of Gaussians in the GMM, which have weighting parameters of relative high values;
processing the set of parameters of the predetermined location history model to determine one or more locations of significance; and
for at least one of the locations of significance:
automatically generating a set of one or more selectable potential location identifiers associated with at least one of the locations of significance;
determining an appropriate time to prompt for user input regarding said at least one of the locations of significance, said user input for refining the set of one or more selectable potential location identifiers into a customized location identifier; and prompting, at the determined appropriate time for said user input by displaying, on a display of the mobile device at least one of the set of one or more selectable potential location identifiers in a tree-like format and displaying one or more yes-or-no questions directed toward selection of one of the selectable potential location identifiers for selection as the customized location identifier.

22. The method according to claim 17, wherein determining the one or more locations of significance comprises recognizing one or more potential locations of significance, assigning significance values to the one or more potential locations of significance, and selecting the one or more locations of significance based at least in part on the significance values.

23. The method according to claim 17, wherein generating the set of one or more potential location identifiers comprises one or more of: analyzing user-generated information stored in memory, selecting one or more identifiers from a list based on user behavior, and selecting one or more identifiers from a list based on pattern of movement of the mobile device.

24. The method according to claim 21, wherein the location history is further associated with captured and recorded information related to one or more of: available wireless connections at one or more locations, user activity during times when a location of significance is visited, and mobile device settings at one or more locations.

25. The method according to claim 21, wherein generating the potential location identifiers is informed at least in part by user input provided in association with a first set of applications of the mobile device, and the customized location identifier is used by a second set of applications of the mobile device.

26. The method according to claim 21, wherein the customized location identifier is used by an application of the mobile device selected from the group comprising: applications for listing and sorting customized location identifiers, applications for adjusting a home screen or a shortlist of easily accessible applications or contacts based on proximity to a location of significance, applications for adjusting operating status of a short range radio based on proximity to a location of significance, and applications for tagging user-generated media.

27. A mobile device comprising:
 a. a positioning module configured to obtain a location history of the mobile device;
 b. a processing module configured to:
  i. process the location history to determine one or more locations of significance;
  ii. generate, for at least one of the locations of significance, a set of one or more potential location identifiers associated therewith;
  iii. determine an appropriate time to prompt for user input regarding said at least one of the locations of significance, said user input for refining the set of one or more potential location identifiers into a customized location identifier; and
  iv. prompt, at the determined appropriate time, for said user input, wherein prompting for said user input comprises displaying at least one of the set of one or more potential location identifiers for selection as the customized location identifier;
 wherein the location history is stored in memory as a set of parameters of a Gaussian Mixture Model (GMM), the GMM comprising a plurality of Gaussians, each Gaussian having a weighting parameter associated therewith, and wherein determining the one or more locations of significance comprises selecting one or more locations corresponding to means of Gaussians in the GMM, which have weighting parameters of relative high values.

28. A method for generating information based at least in part on a location history of a mobile device, the method comprising:
 a. obtaining the location history of the mobile device;
 b. processing the location history to determine one or more locations of significance; and
 c. for at least one of the locations of significance:
  i. automatically generating a set of one or more potential location identifiers associated with at least one of the locations of significance;
  ii. determining an appropriate time to prompt for user input regarding said at least one of the locations of significance, said user input for refining the set of one or more potential location identifiers into a customized location identifier; and
  iii. prompting, at the determined appropriate time, for said user input, wherein prompting for said user input comprises displaying at least one of the set of one or more potential location identifiers for selection as the customized location identifier;
wherein the location history is stored as a set of parameters of a Gaussian Mixture Model (GMM), the GMM comprising a plurality of Gaussians, each Gaussian having a weighting parameter associated therewith, and wherein determining the one or more locations of significance comprises selecting one or more locations corresponding to means of Gaussians in the GMM, which have weighting parameters of relative high values.

* * * * *